(12) United States Patent
Nomura (10) Patent No.: US 9,656,327 B2
(45) Date of Patent: May 23, 2017

(54) DRILL HEAD FOR DEEP HOLE CUTTING (75) Inventor: Takuji Nomura, Amagasaki (JP)

(73) Assignee: botek Präzisionsbohrtechnik GmbH, Riederich (DE)

( * ) Notice: Subject to any disclaimer, the term of this patent is extended or adjusted under 35 U.S.C. 154(b) by 325 days.

(21) Appl. No.: 14/117,910

(22) PCT Filed: May 16, 2011

(86) PCT No.: PCT/JP2011/061181
§ 371 (c)(1),
(2), (4) Date: Feb. 14, 2014

(87) PCT Pub. No.: WO2012/157063
PCT Pub. Date: Nov. 22, 2012

(65) Prior Publication Data
US 2014/0154022 A1 Jun. 5, 2014

(51) Int. Cl.
B23B 41/02 (2006.01)
B23B 51/00 (2006.01)
B23B 51/04 (2006.01)

(52) U.S. Cl.
CPC ...... *B23B 51/0054* (2013.01); *B23B 51/0493* (2013.01); *B23B 2240/08* (2013.01); *B23B 2251/422* (2013.01); *B23B 2251/44* (2013.01); *B23B 2251/56* (2013.01); *Y10T 408/5586* (2015.01)

(58) Field of Classification Search
CPC ....... B23B 41/02; B23B 41/16; B23B 51/048; B23B 51/0486; B23B 51/0493; B23B 2251/422; B23B 2251/424; B23B 2251/44; B23B 2251/446; B23B 2251/56; Y10T 408/557; Y10T 408/558; Y10T 408/5583;
(Continued)

(56) References Cited

U.S. PATENT DOCUMENTS 180,554 A * 8/1876 Cubberley ............. B23B 51/02
408/230
3,138,043 A * 6/1964 Greuner ............. B23B 51/0486
408/144

(Continued)

FOREIGN PATENT DOCUMENTS

DE 1402954 A1 * 5/1969 ......... B23B 51/0493
DE 102009033942 A1 * 1/2011 ............. B23B 51/02
(Continued)

OTHER PUBLICATIONS

Translation of JP 58-044116 U, translated Mar. 2016.*
(Continued)

Primary Examiner — Daniel Howell
(74) Attorney, Agent, or Firm — Collard & Roe, P.C.

(57) ABSTRACT

A drill head for deep-hole drilling includes cutting blade tips brazed to cutting chip discharge ports opened on a head distal end surface, guide pads mounted on a plurality of positions of the circumferential surface at the head distal end side, and a hollow inside portion made into a cutting chip discharge passage communicating with the cutting chip discharge ports. A guide pad portion having an arc surface that slide-contacts with the inner circumference of a cutting hole is formed on the outer end surface of the circumferential portion cutting blade tip.

7 Claims, 5 Drawing Sheets (58) Field of Classification Search
CPC ........... Y10T 408/5586; Y10T 408/905; Y10T 408/906; Y10T 408/909
See application file for complete search history.

(56) References Cited

U.S. PATENT DOCUMENTS

| | | | | |
|---|---|---|---|---|
| 4,268,197 | A | * | 5/1981 | Burgsmuller ....... B23B 51/0486 408/57 |
| 4,813,824 | A | * | 3/1989 | Grunsky ............... B23B 51/048 408/233 |
| 6,019,553 | A | * | 2/2000 | Yakamavich, Jr. . B23B 51/0486 403/199 |
| 7,645,102 | B2 | | 1/2010 | Nomura et al. |
| 2003/0017015 | A1 | * | 1/2003 | Strubler ................. B23B 51/02 408/230 |
| 2009/0110501 | A1 | | 4/2009 | Drori et al. |
| 2009/0120240 | A1 | * | 5/2009 | Nomura ................. B23P 15/32 76/108.2 |
| 2009/0123243 | A1 | * | 5/2009 | Nomura ................. B23B 41/02 408/1 R |
| 2011/0067927 | A1 | | 3/2011 | Nomura |
| 2011/0176878 | A1 | * | 7/2011 | Nomura .............. B23B 51/0493 408/83 |
| 2012/0114440 | A1 | * | 5/2012 | Kress ...................... B23B 51/02 408/227 |

FOREIGN PATENT DOCUMENTS

| | | | | |
|---|---|---|---|---|
| DE | 102010027203 A1 | * | 1/2012 | ............ B23B 51/02 |
| JP | 58044116 U | * | 3/1983 | |
| JP | 2004167645 A | * | 6/2004 | |
| JP | 2006102899 A | * | 4/2006 | |
| JP | 2006-334749 A | | 12/2006 | |
| JP | 2009-255202 A | | 11/2009 | |
| JP | 2011-500350 A | | 1/2011 | |
| SU | 1127704 A | * | 12/1984 | |
| WO | WO 9832564 A1 | * | 7/1998 | ......... B23B 51/0493 |

OTHER PUBLICATIONS

Machine translation of DE 102009033942, printed Nov. 2016.*
International Search Report of PCT/JP2011/061181, mailed Aug. 2, 2011.

* cited by examiner

FIG. 5

DRILL HEAD FOR DEEP HOLE CUTTING

CROSS REFERENCE TO RELATED APPLICATIONS

This application is the National Stage of PCT/JP2011/061181 filed on May 16, 2011, the disclosure of which is incorporated by reference. The international application under PCT article 21(2) was not published in English.

TECHNICAL FIELD

The present invention relates to a drill head for deep-hole drilling including a cutting blade tip mounted by brazing to face a cutting chip discharge port opened on a head distal end surface and a hollow inside portion made into a cutting chip discharge passage communicating with the cutting chip discharge port.

BACKGROUND ART

Figure 5:
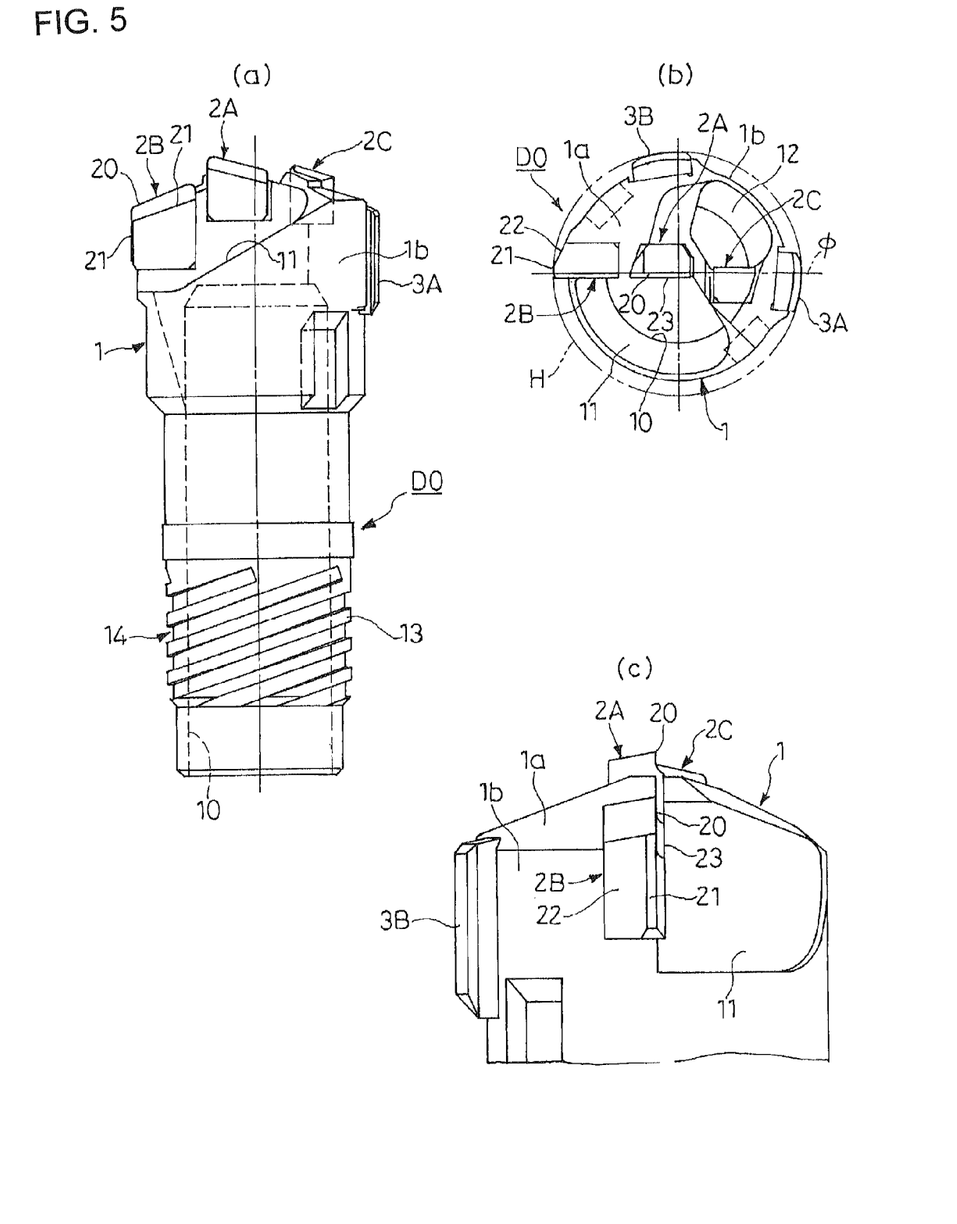
FIG. 5 shows a configuration example of a conventional drill head for deep-hole drilling.

As this kind of drill head for deep-hole drilling, a divided-blade type as shown in FIG. 5(a) to FIG. 5(c) has been conventionally widely used. This drill head D0 includes a head main body 1 having a substantially cylindrical shape including a hollow portion 10 opened at the proximal end side, one large and one small cutting chip discharge ports 11 and 12 communicating with the hollow portion 10 are formed on a substantially obtuse conical head distal end surface 1a, and a central portion cutting blade tip 2A and a circumferential portion cutting blade tip 2B brazed to the opening side edge along a head radial direction $\phi$ of the large cutting chip discharge port 11 and an intermediate portion cutting blade tip 2C brazed to the opening side edge along the same head radial direction $\phi$ of the small cutting chip discharge port 12 so as to assume a posture in which cutting blades 20 of the respective cutting blade tips are along the radial direction $\phi$. Guide pads 3A and 3B having arc surfaces to slide-contact with an inner circumference of a cutting hole H indicated by the imaginary line in FIG. 5(b) are brazed respectively to a position radially opposite to the circumferential portion cutting blade tip 2B and an intermediate position in the middle of a route leading to the circumferential portion cutting blade tip 2B in a cutting rotation direction from the aforementioned position on the outer circumferential surface 1b at the distal end side of the head main body 1. The outer end surface of the circumferential portion cutting blade tip 2B consists of a margin portion 21 facing the front edge in the cutting rotation direction and a flank face 22 to be spaced apart from the inner circumference of a cutting hole along the rear side in the cutting rotation direction from the margin portion 21. The cutting blade tips 2A to 2C and the guide pads 3A and 3B are made of a super hard material such as cemented carbide and cermet, etc.

In this drill head D0, a proximal portion 14 side provided with a male thread 13 on the outer circumference is threaded into and mounted on a distal end portion of a hollow boring bar (whose illustration is omitted), and the boring bar is coupled to a driving shaft such as a spindle of a machine tool and rotatingly-driven or otherwise rotates a work material side, thereby cutting the work material by the cutting blades 20 of the cutting blade tips 2A to 2C to form a deep hole. During the deep-hole drilling work, a coolant is supplied into a cutting region through a gap between a cutting hole H and the boring bar at high pressure, made to flow from the cutting chip discharge ports 11 and 12 into the hollow portion 10 together with cutting chips generated in the cutting region, and discharged outside through the inside of the hollow boring bar.

The guide pads 3A and 3B act to increase the cutting accuracy by maintaining a rotational state on a constant axis without runout of the drill head and crushing and smoothing unevenness of an inner circumferential surface of a cutting hole according to cutting by so-called burnishing action in which the guide pads 3A and 3B slide-contact with the inner circumference of a cutting hole H during drilling work to make the inner circumferential surface of the cutting hole receive the cutting reaction force caused by the cutting blade 20 of each cutting blade tips 2A, 2B, and 2C so that the positional relationship between the slide-contact portion and each cutting blade 20 is kept constant. The margin portion 21 is formed of an inclined surface or an arc surface with a width of approximately 0.2 to 1.0 mm and an inclination angle of approximately 1° to 6° with respect to the tip thickness direction, and accordingly, the margin portion is increased in angle at the outer end front edge portion that line-contacts with the inner circumference of a cutting hole H of the circumferential portion cutting blade tip 2B, and becomes hard to chip, and the margin portion functions to stabilize a cutting state by slide-contacting with the inner circumference of a cutting hole H similar to the guide pads 3A and 3B. It is common that guide pads are provided at the same two positions as described above not only in the illustrated divided-blade type but also in a single-blade type drill head including one cutting blade brazed to the opening side edge of a single cutting chip discharge port provided on the head distal end surface and a drill head including a throwaway tip that has a detachable cutting blade whose blade point can be replaced a plurality of times by rotational displacement.

However, in recent years, it has been demanded to further improve the roundness, cylindricality, and straightness, etc., of a cutting hole by further improving the processing accuracy of deep-hole drilling. Therefore, the inventor of the present invention previously proposed this kind of drill head for deep-hole drilling improved in processing accuracy by well-balanced pressure during drilling work by substantially equalizing the axial lengths and aligning the front and rear end positions in the circumferential direction of the margin portion of the cutting blade tip taking charge of cutting a circumferential side and the two guide pads (Patent Document 1).

PRIOR ART DOCUMENT

Patent Document

[Patent Document 1] Japanese Published Unexamined Patent Application No. 2006-334749

SUMMARY OF THE INVENTION

Problem to be Solved by the Invention

In the drill head for deep-hole drilling according to the proposal described above, the margin portion and the two guide pads slide-contact with the inner circumference of a cutting hole with well-balanced pressure, so that the cutting state becomes very stable, whereby obtaining high processing accuracy. However, the circumferential width of the margin portion is much narrower than the guide pads, so that the margin portion is abraded much faster than the guide pads according to an increase in the number of drilling works, and therefore, the pressure balance is gradually lost and the stable cutting state cannot be kept, and deterioration of processing accuracy leads to deterioration of the roundness, cylindricality, and straightness, etc., of a cutting hole. These defects are more conspicuous in a normal drill head with a short margin portion.

The present invention was made in view of the foregoing circumstances, and accordingly it is an object of the present invention to provide a drill head for deep-hole drilling, more specifically, a drill head for deep-hole drilling to which a cutting blade tip is brazed, capable of keeping a very stable cutting state even if the number of drilling works increases, capable of continuously forming a cutting hole excellent in roundness, cylindricality, and straightness, etc., for a long period of time, and having extremely high accurate processing performance and excellent durability.

Means for Solving the Problem

Means for achieving the aforementioned object will be described with reference numerals of the accompanying drawings. A drill head for deep-hole drilling D1, D2, D3 according to a first aspect of the present invention including one or a plurality of cutting blade tips 2A, 2B, and 2C mounted by brazing to face cutting chip discharge ports 11, 12, and 18 opened on a head distal end surface 1a, guide pads 3A and 3B mounted on a plurality of positions of a circumferential surface 1b at the head distal end side, and a hollow inside portion 10 made into a cutting chip discharge passage 10 communicating with the cutting chip discharge ports 11, 12, and 18, wherein a guide pad portion 4 having an arc surface that slide-contacts with the inner circumference of a cutting hole H is formed on the outer end surface of the cutting blade tip 2B, 2D taking charge of cutting a circumferential side.

A second aspect of the present invention is configured such that the blade point side of the cutting blade tip 2B, 2D taking charge of cutting a circumferential side is set upward, a margin portion 5 facing the front edge in a cutting rotation direction and a flank face 6 to be spaced apart from the inner circumference of the cutting hole along the rear side in the cutting rotation direction from the margin portion 5 are formed at an upper portion side of the outer end surface of the cutting blade tip 2B, 2D, and the guide pad portion 4 is formed at a lower portion side of the outer end surface of the cutting blade tip 2B, 2D in the drill head D1, D2, D3 for deep-hole drilling of the first aspect.

A third aspect of the present invention is configured such that the margin portion 5 and the guide pad portion 4 form a continuous arc surface in the drill head D1, D3 for deep-hole drilling of the second aspect.

A fourth aspect of the present invention is configured such that the margin portion 5 and the guide pad portion 4 are separated from each other by a groove portion 7 in the drill head D2 for deep-hole drilling of the second aspect.

A fifth aspect of the present invention is configured such that the guide pads 3A and 3B are mounted by brazing on a position radially opposite to the cutting blade tip 2B, 2D taking charge of cutting a circumferential side and an intermediate position in the middle of a route leading to a mounting portion of the cutting blade tip 2B, 2D in the cutting rotation direction from the aforementioned position in the drill head D1, D2, D3 for deep-hole drilling of the first aspect.

A sixth aspect of the present invention is configured such that the cutting blade tip 2A, 2B, 2C, 2D is fitted to and brazed to a mounting seat 15 recessed on the head distal end side in the drill head D1, D2, D3 for deep-hole drilling of the first aspect.

A seventh aspect of the present invention is configured such that a stepped chip breaker 23 is formed on the front surface of the cutting blade tip 2A, 2B, 2C, 2D in the drill head D1, D2, D3 for deep-hole drilling of the first aspect.

An eighth aspect of the present invention is configured such that the cutting blade tip 2A, 2B, 2C, 2D is made of a super hard material such as cemented carbide and cermet, etc., in the drill head D1, D2, D3 for deep-hole drilling of the first aspect.

A ninth aspect of the present invention is configured such that the guide pads 3A and 3B are made of a super hard material such as cemented carbide and cermet, etc., in the drill head D1, D2, D3 for deep-hole drilling of the first aspect.

A tenth aspect of the present invention is configured such that respective key ways 17 for twisting operation are formed in radially opposed positions nearer the proximal end side than the mounting positions of the guide pads 3A and 3B mounted on a plurality of positions on the circumferential surface 1b at the head distal end side in the drill head D1, D2, D3 for deep-hole drilling of the first aspect.

Effects of the Invention

Effects of the present invention will be described with reference numerals of the drawings. In the drill head D1, D2, D3 for deep-hole drilling of the first aspect, during drilling work, the guide pad portion formed on the outer end surface of the cutting blade tip 2B, 2D taking charge of cutting a circumferential side slide-contacts with the inner circumference of a cutting hole H together with the plurality of guide pads 3A and 3B mounted on the circumferential surface 1b at the head distal end side. Therefore, a load to be applied to the head distal end portion according to cutting is distributed in a well-balanced manner to the slide-contact portions and received by the inner circumferential surface of the cutting hole H, whereby obtaining a very stable cutting state without runout. Further, in this drill head D1, D2, D3, the width of the guide pad portion 4 of the outer end surface of the cutting blade tip 2B, 2D can be set wide in a range of the thickness of the tip, so that abrasion of the guide pad portion 4 becomes very slow as compared with the margin portion of the cutting blade tip of the conventional configuration, and therefore, even if the number of drilling works increases, high processing accuracy based on the very stable cutting state can be kept, and accordingly, stable formation of a cutting hole excellent in roundness, cylindricality, and straightness, etc., is possible for a long period of time. With this configuration, the cutting blade tip 2B, 2D commonly serves as a guide pad, and there is no need to provide an additional mounting seat for a guide pad near the tip, so that the conventional structure can be adopted as the head main body 1 without change, and an increase in manufacturing cost according to structural change can be avoided.

According to the present invention, in the drill head D1, D2, D3 for deep-hole drilling, a margin portion 5 and a flank face 6 are formed at an upper portion side of the outer end surface of the cutting blade tip 2B, 2D taking charge of cutting a circumferential side, and a guide pad portion 4 is formed on a lower portion side of the same outer end surface, so that a stable cutting state is secured with this guide pad portion 4, and the blade point of the cutting blade tip 2B, 2D is reinforced by the margin portion 5 and is hardly chipped.

Further, according to the present invention, the margin portion 5 and the guide pad portion 4 form a continuous arc surface, therefore, there is an advantage that these portions 4 and 5 can be formed by one process.

According to the present invention, the margin portion 5 and the guide pad portion 4 are separated from each other by the groove portion 7, so that either of an inclined surface and an arc surface can be selected on the margin portion 5 side according to required performance of the blade point portion, and an angle and curvature thereof can also be arbitrarily set.

According to the present invention, guide pads 3A and 3B are mounted on respective specific two positions on the circumferential surface 1b at the head distal end side, so that the pressure balance during drilling work is further improved, whereby realizing high-accuracy drilling work. Other effects of the present invention will be clarified from the embodiments described hereinafter.

BRIEF DESCRIPTION OF THE DRAWINGS

FIG. 1(a) is a perspective view of the same cutting blade tip for the first embodiment, and FIG. 1(b) is a perspective view of the same cutting blade tip for the second embodiment.

FIG. 2(a) is a front view of the whole of the drill head, FIG. 2(b) is a plan view of the same, and FIG. 2(c) is a left side view of a head main body.

FIG. 3(a) is a front view of the whole of the drill head, FIG. 3(b) is a plan view of the same, and FIG. 3(c) is a left side view of a head main body.

FIG. 4(a) is a perspective view of a cutting blade tip, FIG. 4(b) is a plan view of the whole of the drill head, FIG. 4(c) is a left side view of the same, and FIG. 4(d) is a front view of the same.

FIG. 5(a) is a front view of the whole of the drill head, FIG. 5(b) is a plan view of the same, and FIG. 5(c) is a left side view of a head main body.

BEST MODE FOR CARRYING OUT THE INVENTION

Figure 1:
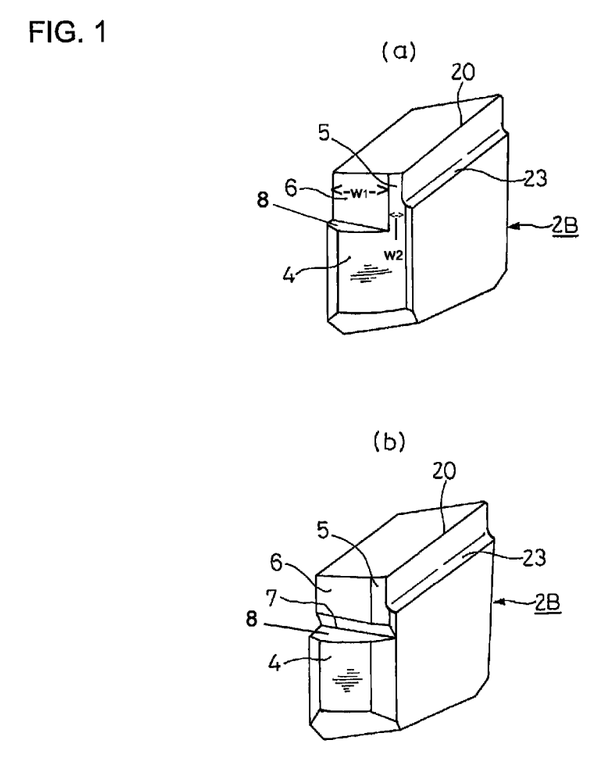
FIG. 1 shows a circumferential portion cutting blade tip to be used for drill heads for deep-hole drilling according to first and second embodiments of the present invention.
Figure 2:
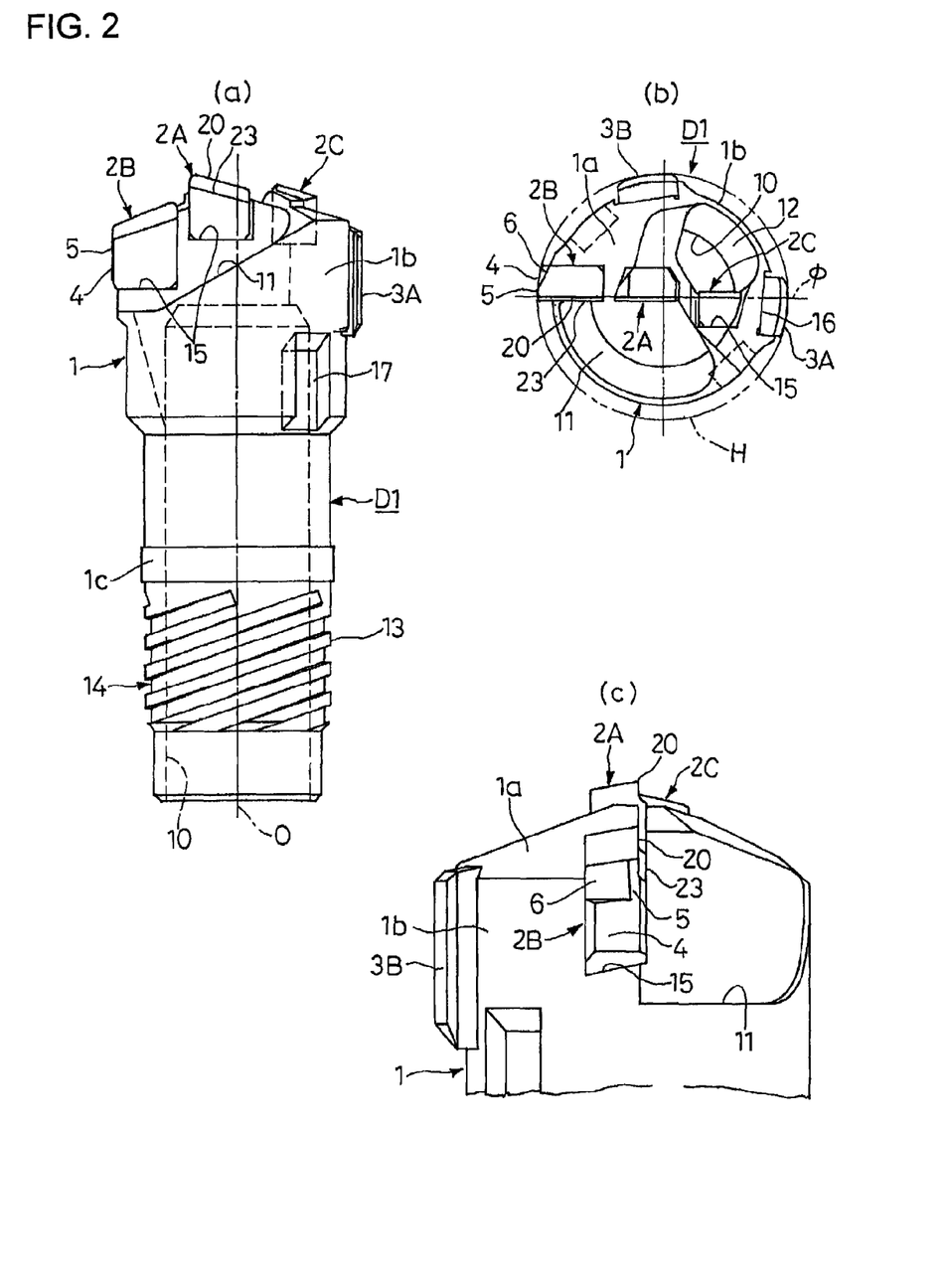
FIG. 2 shows a drill head for deep-hole drilling according to the first embodiment of the present invention.
Figure 3:
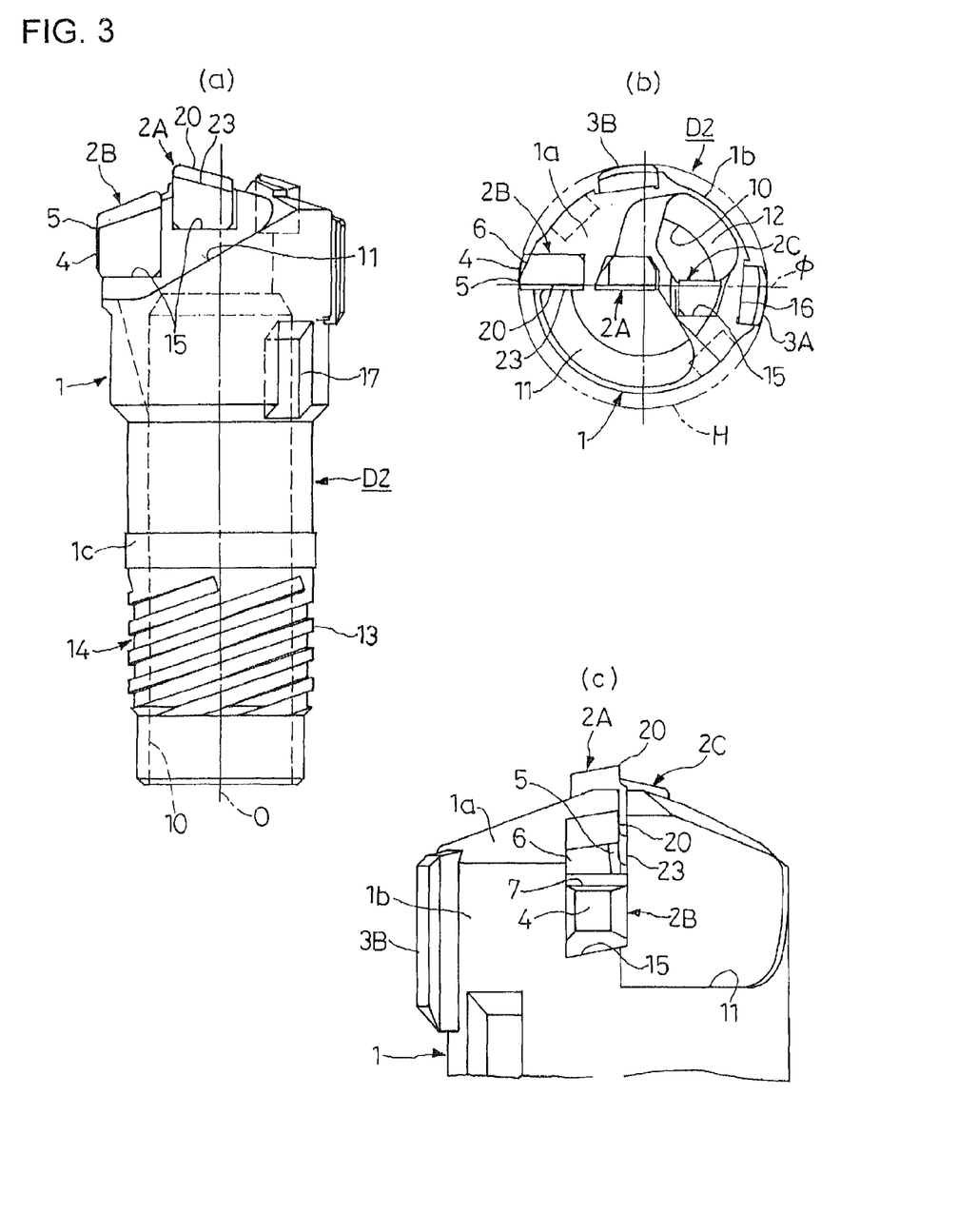
FIG. 3 shows a drill head for deep-hole drilling according to the same second embodiment.
Figure 4:
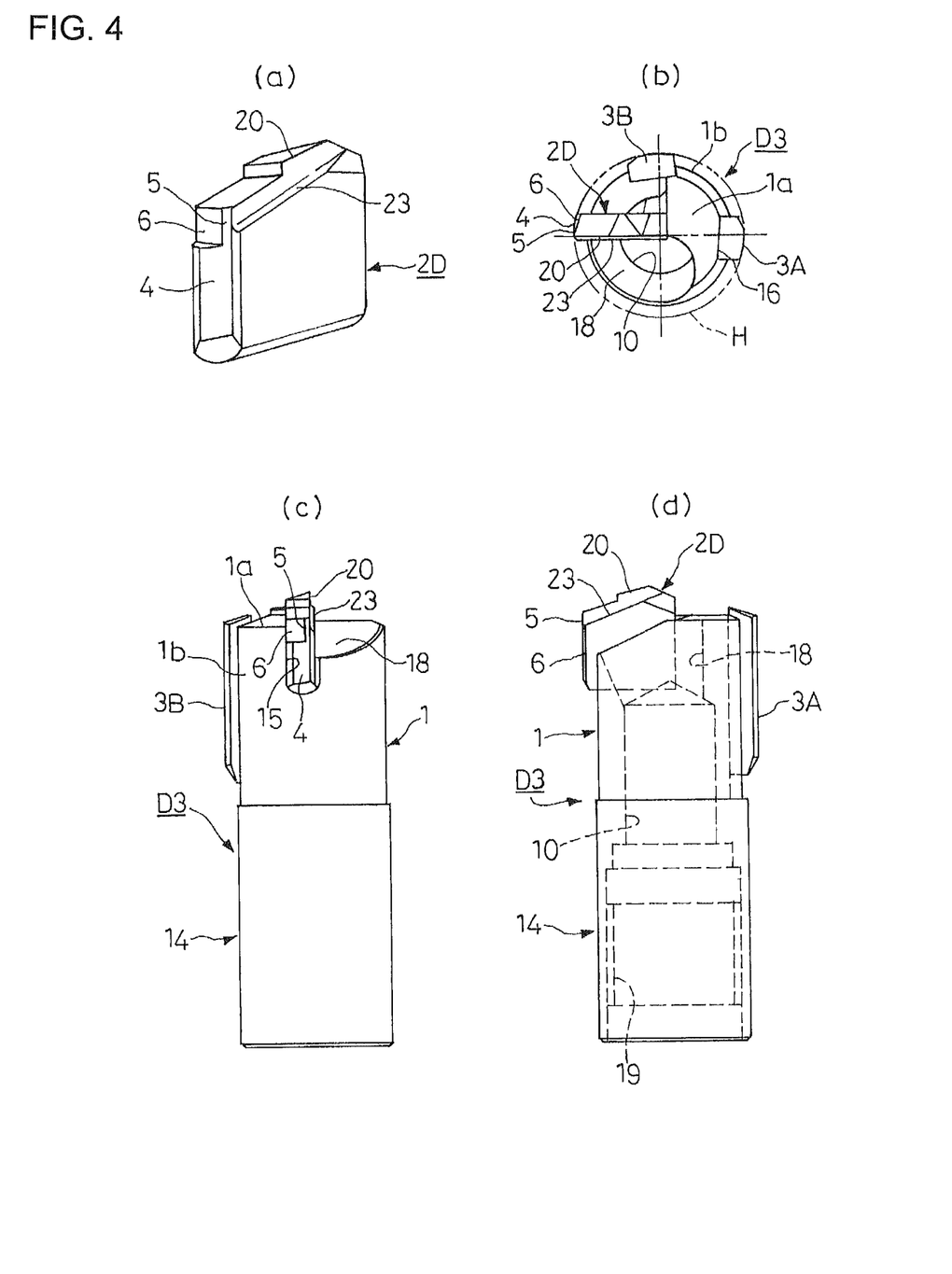
FIG. 4 shows a drill head for deep-hole drilling according to the same third embodiment.

Hereinafter, embodiments of a drill head for deep-hole drilling according to the present invention will be described specifically with reference to the drawings. Drill heads D1 and D2 of the first and second embodiments shown in FIG. 1 to FIG. 3 are of a divided-blade type, and a drill head D3 of the third embodiment shown in FIG. 4 is of a single-blade type. Components common to or identical to each other among the drill heads D1 to D3 of these embodiments and the above-described drill head D0 shown in FIG. 5 described above will be denoted by the same reference numeral.

In the drill heads D1 and D2 for deep-hole drilling of the first and second embodiments, as shown in FIG. 2(a) to FIG. 2(c) and FIG. 3(a) to FIG. 3(c), the head main body 1 has a hollow portion 10 opened at the proximal end side to assume a substantially cylindrical shape, and on a substantially obtuse conical head distal end surface 1a of the head main body 1, one large and one small cutting chip discharge ports 11 and 12 communicating with the hollow portion 10 are formed radially opposite to each other. A central portion cutting blade tip 2A and a circumferential portion cutting blade tip 2B are brazed to the opening side edge along a head radial direction of the large cutting chip discharge port 11 and an intermediate portion cutting blade tip 2C is brazed to the opening side edge along the same head radial direction φ of the small cutting chip discharge port 12 by fitting these cutting blade tips to mounting seats 15 recessed on the head main body 1 side in a posture in which the cutting blade 20 of each cutting blade tip is along the radial direction φ.

The cutting blade 20 of the central portion cutting blade tip 2A is inclined downwardly toward the head center O side, and on the other hand, the cutting blades 20 of the circumferential portion cutting blade tip 2B and the intermediate portion cutting blade tip 2C are inclined upward toward the head center O side. On the front surface of each of the cutting blade tips 2A to 2C, a stepped chip breaker 23 along the cutting blade 20 is formed.

Here, as shown in FIG. 1(a), on an upper portion side of the outer end surface of the circumferential portion cutting blade tip 2B in the drill head D1 for deep-hole drilling of the first embodiment, a margin portion 5 facing the front edge in a cutting rotation direction and a flank face 6 that is to be spaced apart from the inner circumference of a cutting hole H (indicated by the imaginary line in FIG. 2(b)) and along the rear side in the cutting rotation direction from the margin portion 5 are formed, and on a lower portion side of the outer end surface, a guide pad portion 4 is formed, and the margin portion 5 and the guide pad portion 4 form a continuous arc surface. A step 8 is present between the guide pad portion 4 and the flank face 6. On the other hand, as shown in FIG. 1(b), on an upper portion side of the outer end surface of the circumferential portion cutting blade tip 25 in the drill head D2 for deep-hole drilling of the second embodiment, a margin portion 5 and a flank face 6 are formed, and on a lower portion side of the outer end surface, a guide pad portion 4 with an arc surface is formed as in the first embodiment, however, these margin portion 5 and the guide pad portion 4 are separated from each other by a groove portion 7 along the tip width direction. A step 8 is part of the groove 7 that runs between the guide pad portion 4 and the flank face 6. For both embodiments shown in FIGS. 1(a) and 1(b), the flank face 6 has a flank face width w1 extending in the cutting direction and the margin portion 5 has a margin portion width w2 extending in the cutting direction. The flank face width w1 is greater than the margin portion width w2.

On the outer circumferential surface 1b at the distal end side of the head main body 1 of the drill head D1, D2, guide pads 3A and 3B having arc surfaces are respectively brazed to a position radially opposite to the circumferential portion cutting blade tip 2B and an intermediate position in the middle of a route leading to the circumferential portion cutting blade tip 2B in the cutting rotation direction from the aforementioned position, that is, the back side of the central portion cutting blade tip 2A by fitting the guide pads to mounting seats 16 recessed on the head main body 1 side. These both guide pads 3A and 3B and the guide pad portion 4 of the circumferential portion cutting blade tip 2B are disposed so that their arc surfaces slide-contact with the inner circumference of a cutting hole H indicated by the imaginary line in FIG. 2(b) and FIG. 3(b).

At radially opposed positions nearer the proximal end side than the mounting positions of the guide pads 3A and 3B in the head main body 1, key ways 17 for twisting operation are formed, respectively. A male thread 13 is formed on the outer circumferential surface 1c of a proximal portion 14 with an outer diameter smaller than that of the head main body 1, and by threading the proximal portion 14 side into a distal end portion having a female thread of the hollow boring bar whose illustration is omitted, the drill head D1, D2 is coupled to the distal end of the boring bar.

In deep-hole drilling work using the drill head D1, D2 for deep-hole drilling of the first or second embodiment, while rotating the drill head D1, D2 coupled to the above-mentioned boring bar (whose illustration is omitted) or a work material, a coolant supplied through a gap between the inner circumference of a cutting hole H and the outer circumferences of the hollow boring bar and the drill head D1, D2 is continuously fed to a cutting region, and cutting chips generated at the cutting region are caught in the coolant and discharged to the outside from the cutting chip discharge ports 11 and 12 of the drill head D1, D2 through the hollow inside portion of the boring bar.

In this drilling work, the guide pad portion 4 provided on the outer end surface of the circumferential portion cutting blade tip 2B slide-contacts with the inner circumference of a cutting hole H together with the guide pads 3A and 3B mounted on the outer circumferential surface 1b at the distal end side, so that the load to be applied to the head distal end portion according to cutting is distributed in a well-balanced manner to the slide-contact portions and received by the inner circumferential surface of the cutting hole H, and accordingly, a very stable cutting state without runout is obtained and extremely high processing accuracy is realized. In addition, the guide pad portion 4 of the cutting blade tip 2B has a width much wider than that of the margin portion 5, so that abrasion of this portion caused by slide-contact with the inner circumferential surface of the cutting hole H similar to the guide pads 3A and 3B becomes slower, and therefore, even if the number of drilling works increases, the distribution balance of the load is hardly lost, high processing accuracy based on the stable cutting state is maintained, and stable formation of a cutting hole excellent in roundness, cylindricality, and straightness, etc., is possible for a long period of time. The blade point of the cutting blade tip 2B is reinforced by the margin portion 5 and hardly chipped. Further, the slide-contact area of the guide pad portion 4 with the inner circumference of the cutting hole H is large, so that abrasion of the margin portion 5 itself is reduced, and durability of the circumferential portion cutting blade tip 2B and eventually durability of the whole of the drill head D1, D2 are improved.

Further, with the configuration of the drill head D1, D2, the circumferential portion cutting blade tip 2B commonly serves as a guide pad, and there is no need to provide an additional mounting seat for the guide pad near the cutting blade tip 2B, so that the conventional structures can be adopted as the head main body 1 and the proximal portion 14 without change, and there is also an advantage that an increase in manufacturing cost due to structural change can be avoided.

In the drill head D1 for deep-hole drilling of the first embodiment, the margin portion 5 and the guide pad portion 4 of the circumferential portion cutting blade tip 2B form a continuous arc surface, there is an advantage that these portions 5 and 6 can be formed concurrently by one process. On the other hand, in the drill head D2 for deep-hole drilling of the second embodiment, the margin portion 5 and the guide pad portion 4 of the circumferential portion cutting blade tip 23 are separated from each other by the groove portion 7, so that on the margin portion 5 side, either an inclined surface or an arc surface can be selected according to required performance of the blade point portion, and the angle of the inclined surface and the curvature of the arc surface can also be arbitrarily set.

The drill heads D1 and D2 for deep-hole drilling of the first and second embodiments are of a divided-blade type, however, the present invention is also applicable to a single-blade type like the drill head D3 for deep-hole drilling of the third embodiment shown in FIG. 4(a) to FIG. 4(d).

In the drill head D3 for deep-hole drilling of the third embodiment, on a substantially obtuse conical head distal end surface 1a of a substantially cylindrical head main body 1 having a hollow portion 10 opened at the proximal end side, a substantially fan-shaped cutting chip discharge port 18 communicating with the hollow portion 10 is formed, and a cutting blade tip 2D is brazed to the opening side edge along a head radial direction φ by fitting the cutting blade tip to amounting seat 15 recessed on the head main body 1 side in a posture in which the cutting blade 20 is along the radial direction φ. As in the case of the first and second embodiments, on the outer circumferential surface 1b at the distal end side of the head main body 1, guide pads 3A and 3B having arc surfaces are respectively brazed to a position radially opposite to the cutting blade tip 2D and a position on the back side of the cutting blade tip 2B by fitting these guide pads to mounting seats 16 recessed on the head main body 1 side. A proximal portion 14 has an outer diameter slightly larger than that of the head main body, and has a female thread 19 on the inner circumference.

The cutting blade tip 2D in this drill head D3 has an inner end at a position slightly beyond the head shaft center O, a cutting blade 20 that is inclined upward in a two-step manner from the head circumferential side toward the head shaft center O side and further inclined downward toward the inner end side from the top portion, and a chip breaker 23 positioned on the front surface side and along the upward incline of the cutting blade 20. On the outer end surface of the cutting blade tip 2D, in the same manner as the cutting blade tip 2B of the first embodiment, a margin portion 5 facing the front edge in the cutting rotation direction and a flank face 6 to be spaced apart from the inner circumference of a cutting hole H (indicated by the imaginary line in FIG. 4(b)) and along the rear side in the cutting rotation direction are formed at an upper portion side, and at a lower portion side of the same outer end surface, a guide pad portion 4 is formed, and the margin portion 5 and the guide pad portion 4 form a continuous arc surface.

In deep-hole drilling work using the drill head D3 for deep-hole drilling, a male-threaded distal end portion of a boring bar (whose illustration is omitted) is threaded into and coupled to the proximal portion 14 having the female thread 19, and while rotating the drill head D3 or a work material, a coolant supplied through a gap between the inner circumference of a cutting hole H and the outer circumferences of the hollow boring bar and the drill head D3 is continuously fed to a cutting region, and cutting chips are caught in the coolant and discharged to the outside from the cutting chip discharge port 18 of the drill head D3 through the hollow portion 10 and the hollow inside portion of the boring bar.

As in the case of the first and second embodiments described above, in the drill head D3 for deep-hole drilling of the third embodiment, the guide pad portion 4 on the outer end surface of the cutting blade tip 2D slide-contacts with the inner circumference of a cutting hole H together with the guide pads 3A and 3B, and a load to be applied to the head main body 1 according to cutting is distributed in a well-balanced manner to the slide-contact portions and received by the inner circumferential surface of the cutting hole H, so that a very stable cutting state without runout and extremely high processing accuracy are obtained, and abrasion of the guide pad portion 4 hardly advances, so that a stable cutting state is maintained even if the number of drilling works increases, and stable formation of a cutting hole excellent in roundness, cylindricality, and straightness, etc., is possible for a long period of time. In addition, due to the margin portion 5, the blade point of the cutting blade tip 2D is hardly chipped, and abrasion of the margin portion 5 itself is reduced, so that the durability of the cutting blade tip 2D and eventually the durability of the whole of the drill head D3 are significantly improved.

In a drill head for deep-hole drilling according to the present invention, it is preferable that the curvature of the arc surface of the guide pad portion provided on the outer end surface of a cutting blade tip taking charge of cutting a circumferential side is set to be equal to or slightly larger than the curvature of a cutting hole H. As illustrated in the first to third embodiments, by setting the positions of the guide pads to be mounted to the outer circumferential surface of the head main body to a position radially opposite to the cutting blade tip taking charge of cutting a circumferential side and an intermediate position in the middle of a route leading to the cutting blade tip taking charge of cutting a circumferential side in the cutting rotation direction from the aforementioned position, the pressure balance during drilling work becomes the most excellent, and higher accuracy drilling work is realized.

Moreover, detailed configurations such as the shape of the cutting blade tip, the shape of the guide pad, etc., can be modified in various ways other than the embodiments in the present invention.

DESCRIPTION OF THE REFERENCE SYMBOLS

1 Head main body
1a Head distal end surface
1b Circumferential surface
10 Hollow portion (cutting chip discharge passage)
11, 12 Cutting chip discharge port
14 Proximal portion
18 Cutting chip discharge port
2A-2D Cutting blade tip
3A, 3B Guide pad
4 Guide pad portion
5 Margin portion
6 Flank face
7 Groove portion
8 step
20 Cutting blade
23 Chip breaker
D1-D3 Drill head for deep-hole drilling
H Cutting hole
w1 flank face width
w2 margin portion width

What is claimed is:

1. A drill head for deep-hole drilling including
one or a plurality of cutting blade tips mounted by brazing to face a cutting chip discharge port opened on a head distal end surface,
guide pads mounted on a plurality of positions of a circumferential surface at the head distal end side, and
a hollow inside portion made into a cutting chip discharge passage communicating with the cutting chip discharge port,
wherein a guide pad portion having an arc surface that slide-contacts with the inner circumference of a cutting hole is formed on the outer end surface of the cutting blade tip taking charge of cutting a circumferential side,
wherein the blade point side of the cutting blade tip taking charge of cutting a circumferential side is set upward,
wherein a margin portion facing the front edge in a cutting rotation direction and a flank face to be spaced apart from the inner circumference of the cutting hole along the rear side in the cutting rotation direction from the margin portion are formed at an upper portion side of the outer end surface of the cutting blade tip,
wherein the guide pad portion is formed at a lower portion side of the outer end surface of the cutting blade tip,
wherein the margin portion has a margin portion width extending in the cutting rotation direction, the flank face has a flank face width extending in the cutting rotation direction, and the flank face width is greater than the margin portion width,
wherein the flank face and the guide pad portion are separated from each other via a step, and
wherein the margin portion and the guide pad portion are separated from each other by a groove portion.

2. The drill head for deep-hole drilling according to claim 1, wherein the guide pads are mounted by brazing on a position radially opposite to the cutting blade tip taking charge of cutting a circumferential side and an intermediate position in the middle of a route leading to a mounting portion of the cutting blade tip in the cutting rotation direction from the aforementioned position.

3. The drill head for deep-hole drilling according to claim 1, wherein the cutting blade tip is fitted to and brazed to a mounting seat recessed on the head distal end side.

4. The drill head for deep-hole drilling according to claim 1, wherein a stepped chip breaker is formed on the front surface of the cutting blade tip.

5. The drill head for deep-hole drilling according to claim 1, wherein the cutting blade tip is made of a super hard material.

6. The drill head for deep-hole drilling according to claim 1, wherein the guide pads are made of a super hard material.

7. The drill head for deep-hole drilling according to claim 1, wherein respective key ways for twisting operation are formed in radially opposed positions nearer the proximal end side than the mounting positions of the guide pads mounted on a plurality of positions on the circumferential surface at the head distal end side.

* * * * *